US012679746B2

(12) United States Patent
Kim et al.

(10) Patent No.: US 12,679,746 B2
(45) Date of Patent: Jul. 14, 2026

(54) POSITIVE ELECTRODE ACTIVE MATERIAL FOR LITHIUM SECONDARY BATTERY, METHOD FOR PREPARING THE SAME AND LITHIUM SECONDARY BATTERY COMPRISING THE SAME

(71) Applicant: LG Energy Solution, Ltd., Seoul (KR)

(72) Inventors: Ji-Hye Kim, Daejeon (KR); Tae-Gu Yoo, Daejeon (KR); Wang-Mo Jung, Daejeon (KR); Hae-Jung Jung, Daejeon (KR); Chi-Ho Jo, Daejeon (KR); Jong-Wook Heo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 555 days.

(21) Appl. No.: 18/038,342

(22) PCT Filed: Nov. 25, 2021

(86) PCT No.: PCT/KR2021/017565
§ 371 (c)(1),
(2) Date: May 23, 2023

(87) PCT Pub. No.: WO2022/114824
PCT Pub. Date: Jun. 2, 2022

(65) Prior Publication Data
US 2023/0416113 A1 Dec. 28, 2023

(30) Foreign Application Priority Data
Nov. 25, 2020 (KR) ........................ 10-2020-0159518

(51) Int. Cl.
*C01G 53/50* (2025.01)
*H01M 10/052* (2010.01)

(52) U.S. Cl.
CPC .......... *C01G 53/50* (2013.01); *H01M 10/052* (2013.01); *C01P 2002/60* (2013.01);
(Continued)

(58) Field of Classification Search
CPC .. C01G 53/50; H01M 10/052; C01P 2002/60; C01P 2004/50; C01P 2004/61; C01P 2006/11; C01P 2006/40
(Continued)

(56) References Cited

U.S. PATENT DOCUMENTS

2012/0070743 A1    3/2012   Kwon et al.
2015/0010819 A1    1/2015   Lee et al.
(Continued)

FOREIGN PATENT DOCUMENTS

CN       104300138 A      1/2015
CN       110431695 A      11/2019
(Continued)

OTHER PUBLICATIONS

English translation of Written Opinion for PCT/KR2021/017565. (Year: 2022).*
(Continued)

*Primary Examiner* — Patricia L. Hailey
(74) *Attorney, Agent, or Firm* — Lerner David LLP

(57)          ABSTRACT
A positive electrode active material including at least one secondary particle comprising an agglomerate of primary macro particles is provided. A method for preparing the same and a lithium secondary battery containing the same are also provided. The positive electrode active material contains secondary particle with improved resistance by simultaneous growth of the average particle size D50 and the crystal size of the primary macro particle. The positive electrode active material has high crystal density and improved life and resistance characteristics by ensuring the movement path of lithium ions and minimizing defects in the crystal structure of the positive electrode active material.

12 Claims, 2 Drawing Sheets

(52) U.S. Cl.
   CPC ...... *C01P 2004/50* (2013.01); *C01P 2004/61* (2013.01); *C01P 2006/11* (2013.01); *C01P 2006/40* (2013.01)

(58) Field of Classification Search
   USPC ..................................................... 429/231.95
   See application file for complete search history.

(56) References Cited

U.S. PATENT DOCUMENTS

| | | | |
|---|---|---|---|
| 2015/0024275 A1 | 1/2015 | Ishida et al. | |
| 2016/0013486 A1 | 1/2016 | Hirai et al. | |
| 2016/0036041 A1* | 2/2016 | Uwai | C01G 53/50 |
| | | | 429/231.1 |
| 2016/0079599 A1* | 3/2016 | Li | H01M 4/366 |
| | | | 429/231.95 |
| 2018/0183039 A1 | 6/2018 | Koga et al. | |
| 2018/0316005 A1 | 11/2018 | Shin et al. | |
| 2020/0161650 A1 | 5/2020 | Park et al. | |
| 2020/0185712 A1 | 6/2020 | Hiratsuka | |
| 2020/0388830 A1 | 12/2020 | Lee et al. | |
| 2021/0328275 A1 | 10/2021 | Cai et al. | |
| 2021/0408537 A1 | 12/2021 | Hwang et al. | |
| 2022/0029145 A1 | 1/2022 | Park et al. | |

FOREIGN PATENT DOCUMENTS

| | | | | |
|---|---|---|---|---|
| CN | 111129448 | A | 5/2020 | |
| CN | 111200120 | A | 5/2020 | |
| EP | 1801904 | A1 | 6/2007 | |
| JP | 2003187795 | A | 7/2003 | |
| JP | 2009-536438 | A | 10/2009 | |
| JP | 2015-023021 | A | 2/2015 | |
| JP | 5967287 | B2 | 8/2016 | |
| JP | 2020-515010 | A | 5/2020 | |
| JP | 2020087858 | A * | 6/2020 | ............ C01G 53/00 |
| JP | 2021-507497 | A | 2/2021 | |
| JP | 2022-513765 | A | 2/2022 | |
| JP | 2022-535308 | A | 8/2022 | |
| KR | 20120030774 | A | 3/2012 | |
| KR | 20150006283 | A | 1/2015 | |
| KR | 20150010556 | A | 1/2015 | |
| KR | 20150065046 | A * | 6/2015 | ............ C01G 53/82 |
| KR | 20170084230 | A | 7/2017 | |
| KR | 20180121267 | A | 11/2018 | |
| KR | 20190059249 | A | 5/2019 | |
| KR | 20190093453 | A | 8/2019 | |
| KR | 20200059164 | A | 5/2020 | |
| WO | 2006-095594 | A1 | 9/2006 | |
| WO | 2007129860 | A1 | 11/2007 | |
| WO | 2019-044205 | A1 | 3/2019 | |

OTHER PUBLICATIONS

Search Report dated Jun. 24, 2025 from the Office Action for Chinese Application No. 202180078378.1 issued Jun. 26, 2025, pp. 1-2.

International Search Report for PCT/KR2021/017565 mailed Mar. 18, 2022. 3 pages.

* cited by examiner

FIG. 2

POSITIVE ELECTRODE ACTIVE MATERIAL FOR LITHIUM SECONDARY BATTERY, METHOD FOR PREPARING THE SAME AND LITHIUM SECONDARY BATTERY COMPRISING THE SAME

CROSS-REFERENCE TO RELATED APPLICATION(S)

The present application is a national phase entry under 35 U.S.C. § 371 of International Application No. PCT/KR2021/017565, filed on Nov. 25, 2021, which claims priority to Korean Patent Application No. 10-2020-0159518, filed on Nov. 25, 2020, in the Republic of Korea, the disclosures of which are incorporated herein by reference.

TECHNICAL FIELD

The present disclosure relates to a positive electrode active material for a lithium secondary battery comprising primary macro particles and a method for preparing the same.

BACKGROUND ART

Recently, with the widespread use of electronic devices using batteries, for example, mobile phones, laptop computers and electric vehicles, there is a fast growing demand for secondary batteries with small size, light weight and relatively high capacity. In particular, lithium secondary batteries are gaining attention as a power source for driving mobile devices due to their light weight and high energy density advantages. Accordingly, there are many efforts to improve the performance of lithium secondary batteries.

A lithium secondary battery includes an organic electrolyte solution or a polymer electrolyte solution filled between a positive electrode and a negative electrode made of an active material capable of intercalating and deintercalating lithium ions, and produces electrical energy by oxidation and reduction reactions during intercalation/deintercalation of lithium ions at the positive electrode and the negative electrode.

The positive electrode active material of the lithium secondary battery includes lithium cobalt oxide ($LiCoO_2$), lithium nickel oxide ($LiNiO_2$), lithium manganese oxide ($LiMnO_2$ or $LiMn_2O_4$) and a lithium iron phosphate compound ($LiFePO_4$). Among them, lithium cobalt oxide ($LiCoO_2$) is widely used due to its high operating voltage and large capacity advantages, and is used as a positive electrode active material for high voltage. However, cobalt (Co) has a limitation in its use in large amounts as a power source in the field of electric vehicles due to its price rise and unstable supply, and thus there is a need for development of a positive electrode active material as an alternative.

Accordingly, nickel cobalt manganese based lithium composite transition metal oxide (hereinafter simply referred to as 'NCM based lithium composite transition metal oxide') with partial substitution of nickel (Ni) and manganese (Mn) for cobalt (Co) has been developed.

Meanwhile, the conventional NCM based lithium composite transition metal oxide is in the form of a secondary particle formed by agglomeration of primary micro particles, and has a large specific surface area and low particle rigidity, and when an electrode is manufactured and undergoes a rolling process, a large amount of gas is produced during cell operation due to cracking of the secondary particle, resulting in poor cycling performance and low stability. In particular, high-Ni NCM based lithium composite transition metal oxide with high capacity has low structural and chemical stability and is more difficult to ensure thermal stability.

DISCLOSURE

Technical Problem

The present disclosure is directed to providing a positive electrode active material in the form of a secondary particle having the average particle size D50 of the same or similar level to the conventional art, comprising primary macro particles as opposed to the conventional art, thereby minimizing particle cracking in a rolling process.

The present disclosure is further directed to providing a positive electrode active material with increased true density (crystal density).

Accordingly, the present disclosure is further directed to providing a positive electrode active material with improved life and resistance characteristics.

Technical Solution

An aspect of the present disclosure provides a positive electrode active material of the following embodiment.

Specifically, there is provided a positive electrode active material for a lithium secondary battery, comprising at least one secondary particle comprising an agglomerate of primary macro particles, wherein an average particle size D50 of the primary macro particle is 2 μm or more, a ratio of the average particle size D50 of the primary macro particle/an average crystal size of the primary macro particle is 8 or more, an average particle size D50 of the secondary particle is 3 μm to 10 μm, and a crystal density of the secondary particle is 4.74 or more.

There may be provided the positive electrode active material for a lithium secondary battery, wherein the average crystal size of the primary macro particle is 200 nm or more.

There may be provided the positive electrode active material for a lithium secondary battery, wherein a ratio of the average particle size D50 of the secondary particle/the average particle size D50 of the primary macro particle is 2 to 4 times.

There may be provided the positive electrode active material for a lithium secondary battery, wherein the secondary particle comprises nickel-based lithium transition metal oxide.

There may be provided the positive electrode active material for a lithium secondary battery, wherein the nickel-based lithium transition metal oxide comprises $LiaNi_{1-x-y}Co_xM1_yM2_wO_2$ ($1.0 \le a \le 1.5$, $0 \le x \le 0.2$, $0 \le y \le 0.2$, $0 \le w \le 0.1$, $0 \le x+y \le 0.2$, M1 includes at least one selected from the group consisting of Mn and Al, and M2 includes at least one selected from the group consisting of Ba, Ca, Zr, Ti, Mg, Ta, Nb and Mo).

There may be provided the positive electrode active material for a lithium secondary battery, wherein the positive electrode active material comprises a sintering additive, the sintering additive including at least one of zirconium, yttrium or strontium.

There may be provided the positive electrode active material for a lithium secondary battery, wherein the positive electrode active material is coated with a boron containing material on a surface.

There may be provided the positive electrode active material for a lithium secondary battery, wherein the positive electrode active material is coated with a cobalt containing material on a surface.

There may be provided a positive electrode for a lithium secondary battery comprising the positive electrode active material according to the above-described embodiment.

There may be provided a lithium secondary battery comprising the positive electrode active material the above-described embodiment.

Another aspect of the present disclosure provides a method for preparing a positive electrode active material.

Specifically, the present disclosure relates to a method for preparing a positive electrode active material for a lithium secondary battery, comprising (S1) mixing a nickel-based transition metal oxide precursor having a tap density of 2.0 g/cc or less with a lithium precursor and performing primary sintering; and (S2) performing secondary sintering on the primary sintered product, wherein the positive electrode active material for a lithium secondary battery comprises at least one secondary particle comprising an agglomerate of primary macro particles through the primary sintering and the secondary sintering, an average particle size D50 of the primary macro particle is 2 μm or more, a ratio of the average particle size D50 of the primary macro particle/an average crystal size of the primary macro particle is 8 or more, and an average particle size D50 of the secondary particle is 3 μm to 10 μm, and a crystal density of the secondary particle is 4.74 or more.

There may be provided the method for preparing a positive electrode active material for a lithium secondary battery, wherein a temperature of the primary sintering is 780 to 900° C.

Advantageous Effects

According to an embodiment of the present disclosure, it is possible to provide a positive electrode active material comprising secondary particle with improved resistance by simultaneous growth of the average particle size D50 and the crystal size of primary macro particles.

According to an embodiment of the present disclosure, it is possible to provide a nickel-based positive electrode active material with increased true density (crystal density). Accordingly, it is possible to provide a nickel-based positive electrode active material with improved life and resistance characteristics by ensuring the movement path of lithium ions and minimizing defects in the crystal structure of the positive electrode active material.

DESCRIPTION OF DRAWINGS

The accompanying drawings illustrate the preferred embodiment of the present disclosure, and together with the above description, serve to help a further understanding of the technical aspects of the present disclosure, so the present disclosure should not be construed as being limited to the drawings. Meanwhile, the shape, size, scale or proportion of the elements in the accompanying drawings may be exaggerated to emphasize a more clear description.

FIG. 2 is a graph showing resistance and state of charge (SOC) according to example and comparative example of the present disclosure.

BEST MODE

Figure 1:
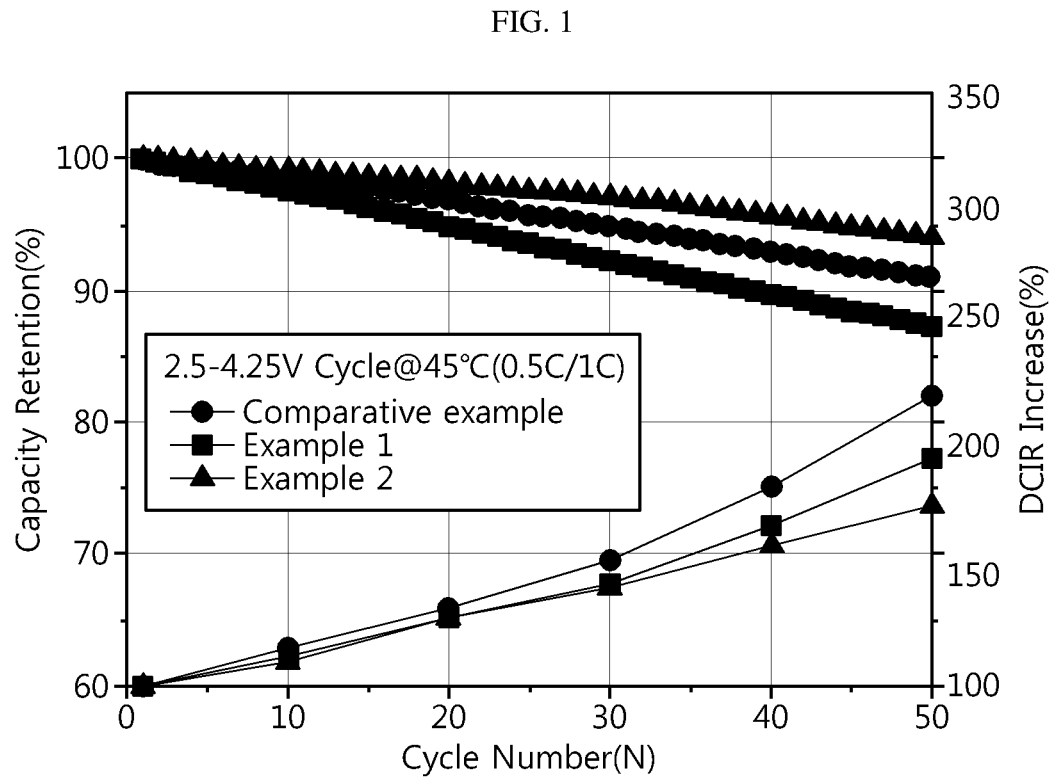
FIG. 1 is a graph showing capacity retention and resistance according to example and comparative example of the present disclosure.

Hereinafter, embodiments of the present disclosure will be described in detail. Prior to the description, it should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the disclosure of the embodiments described herein is just a most preferred embodiment of the present disclosure, but not intended to fully describe the technical aspects of the present disclosure, so it should be understood that a variety of other equivalents and modifications could have been made thereto at the time that the application was filed.

Unless the context clearly indicates otherwise, it will be understood that the term "comprises" when used in this specification, specifies the presence of stated elements, but does not preclude the presence or addition of one or more other elements.

In the specification and the appended claims, "comprising multiple crystal grains" refers to a crystal structure formed by two or more crystal particles having a specific range of average crystal sizes. In this instance, the crystal size of the crystal grain may be quantitatively analyzed using X-ray diffraction analysis (XRD) by Cu Kα X-ray (Xrα). Specifically, the average crystal size of the crystal grain may be quantitatively analyzed by putting a prepared particle into a holder and analyzing diffraction grating for X-ray radiation onto the particle.

In the specification and the appended claims, D50 may be defined as a particle size at 50% of particle size distribution, and may be measured using a laser diffraction method.

In the present disclosure, 'primary particle' refers to a particle having seemingly absent grain boundary when observed with the field of view of 5000 to 20000 magnification using a scanning electron microscope.

In the present disclosure, 'secondary particle' is a particle formed by agglomeration of the primary particles.

In the present disclosure, 'monolith' refers to a particle that exists independently of the secondary particle, and has seemingly absent grain boundary, and for example, it is a particle having the particle diameter of 1 μm or more.

In the present disclosure, 'particle' may include any one of the monolith, the secondary particles and the primary particle or all of them.

Positive Electrode Active Material

An aspect of the present disclosure provides a positive electrode active material in the form of a secondary particle that is different from the conventional art.

Specifically, there is provided a positive electrode active material for a lithium secondary battery, 1) comprising at least one secondary particle comprising an agglomerate of primary macro particles, 2) wherein the average particle size D50 of the primary macro particle is 2 μm or more, 3) a ratio of the average particle size D50 of the primary macro particle/the average crystal size of the primary macro particle is 8 or more, 4) the average particle size D50 of the secondary particle is 3 to 10 μm, and 5) the true density (crystal density) of the secondary particle is 4.74 or more.

The primary and secondary particles having the features 1) to 5) may provide a nickel-based positive electrode active material with improved life and resistance characteristics.

Hereinafter, the features 1) to 5) of the primary and secondary particles will be described in detail.

Particle Shape and Primary Macro Particle

In general, nickel-based lithium transition metal oxide is in the form of a secondary particle. The secondary particle may be an agglomerate of primary particles.

Specifically, a nickel-based lithium transition metal oxide secondary particle may be obtained by using a dense nickel-based lithium transition metal hydroxide secondary particle prepared by a coprecipitation method as a precursor, mixing the precursor with a lithium precursor, and sintering at the temperature of lower than 960° C. However, when a positive electrode active material comprising the conventional secondary particles is coated on a current collector and rolled, particle cracking occurs and the specific surface area increases. When the specific surface area increases, rock salt is formed on the surface, resulting in low resistance.

To solve this problem, a positive electrode active material in the form of monolith has been additionally developed. Specifically, as opposed to the above-described conventional method using dense nickel-based lithium transition metal hydroxide secondary particle as a precursor, instead of the conventional precursor, the use of a porous precursor makes it possible to synthesize at lower sintering temperatures for the same nickel content, and obtain nickel-based lithium transition metal oxide in the form of monolith, not a secondary particle. However, when the positive electrode active material comprising monolith is coated on a current collector and rolled, the monolith does not crack, but the other active material cracks.

An aspect of the present disclosure is provided to solve the problem.

When sintering is performed at higher sintering temperatures using a dense precursor in the same way as the conventional art, the average particle size D50 of a primary particle increases, and the average particle size D50 of a secondary particle increases as well.

In contrast, the secondary particle according to an aspect of the present disclosure is different from the method for obtaining the conventional monolith as below.

As described above, the conventional monolith is formed at higher primary sintering temperature using the existing precursor for secondary particle. In contrast, the secondary particle according to an aspect of the present disclosure uses a porous precursor. Accordingly, it is possible to grow a primary macro particle having a large particle size without increasing the sintering temperature, and by contrast, a secondary particle grows less than the conventional art.

Accordingly, the secondary particle according to an aspect of the present disclosure has the same or similar average particle size D50 to the conventional art and a large average particle size D50 of the primary particle. That is, as opposed to the typical configuration of the conventional positive electrode active material, i.e., a secondary particle formed by agglomeration of primary particles having a small average particle size, there is provided a secondary particle formed by agglomeration of primary macro particles, namely, primary particles having a larger size.

Specifically, the secondary particle according to an aspect of the present disclosure refers to an agglomerate of primary macro particles. In a specific embodiment of the present disclosure, the secondary particle may be an agglomerate of 1 to 10 primary macro particles. More specifically, the secondary particle may be an agglomerate of 1 or more, 2 or more, 3 or more or 4 or more primary macro particles in the numerical range, and may be an agglomerate of 10 or less, 9 or less, 8 or less, or 7 or less primary macro particles in the numerical range.

In the present disclosure, the 'primary macro particle' has the average particle size D50 of 2 μm or more.

In a specific embodiment of the present disclosure, the average particle size of the primary macro particle may be 2 μm or more, 2.5 μm or more, 3 μm or more, or 3.5 μm or more, and may be 5 μm or less, 4.5 μm or less, or 4 μm or less. When the average particle size of the primary macro particle is less than 2 μm, it corresponds to the conventional secondary particle and particle cracking may occur during the rolling process.

Meanwhile, in the present disclosure, the 'primary macro particle' has a ratio of the average particle size D50/the average crystal size of 8 or more. That is, when compared with the primary micro particles that form the conventional secondary particle, the primary macro particle has simultaneous growth of the average particle size and the average crystal size of the primary particle.

From the perspective of crack, a seemingly absent grain boundary like the conventional monolith and a large average particle size are advantageous. Accordingly, the inventors have made great efforts to grow the average particle size D50 of the primary particle. During the research, they have found that when only the average particle size D50 of the primary particle is increased by oversintering, rock salt is formed on the surface of the primary particle, and the initial resistance increases. To solve the problem, the inventors have invented a way to reduce the resistance. Additionally, to reduce the resistance, it is necessary to grow the crystal size of the primary particle as well.

Accordingly, in the present disclosure, the primary macro particle refers to a particle having a large average particle size as well as a large average crystal size and a seemingly absent grain boundary.

Simultaneously growing the average particle size and the average crystal size of the primary particle is advantageous in terms of low resistance and long life, compared to the conventional monolith having the increased resistance due to the rock salt formed on the surface by sintering at high temperature.

In this instance, the average crystal size of the primary macro particle may be quantitatively analyzed using X-ray diffraction analysis (XRD) by Cu Kα X-ray. Specifically, the average crystal size of the primary macro particle may be quantitatively analyzed by putting the prepared particle into a holder and analyzing diffraction grating for X-ray radiation onto the particle.

In a specific embodiment of the present disclosure, the ratio of the average particle size D50/the average crystal size is 8 or more, and preferably 10 or more.

Additionally, the average crystal size of the primary macro particle may be 200 nm or more, 250 nm or more, or 300 nm or more.

Secondary Particle

The secondary particle according to an aspect of the present disclosure has the same or similar average particle size D50 to the conventional art and a large average particle size D50 of the primary particle. That is, as opposed to the typical configuration of the conventional positive electrode active material, i.e., a secondary particle formed by agglomeration of primary particles having a small average particle size, there is provided a secondary particle formed by agglomeration of primary macro particles, namely, primary particles having a larger size.

The secondary particle according to an aspect of the present disclosure has the average particle size D50 of 3 μm to 10 μm. More specifically, the average particle size D50 of the secondary particle may be 4 μm to 8 μm, and may be 4 μm or more, 4.5 μm or more, 5 μm or more, 5.5 μm or more, or 6 μm or more, and may be 8 μm or less, 7.5 μm or less, 7 μm or less, or 6.5 μm or less.

In general, no matter what type of particle, at the same composition, the particle size and the average crystal size in the particle increase with the increasing sintering temperature. In contrast, the primary particle according to an aspect of the present disclosure is a primary macro particle grown to a large particle size without increasing the sintering temperature compared to the conventional art, and by contrast, the secondary particle grows less than the conventional art.

Accordingly, the secondary particle according to an aspect of the present disclosure has the same or similar average particle size D50 to the conventional secondary particle and comprises primary macro particles having a larger average particle size and a larger average crystal size than the conventional primary micro particle.

For example, the secondary particle according to an aspect of the present disclosure may comprise a secondary particle having the average particle size D50 of about 5 μm formed by agglomeration of ten or less primary macro particles having the average particle size D50 of about 2.5 μm. In the rolling process of a positive electrode active material, cracking of the secondary particle does not occur, and when blended with other particle and rolled, particle cracking is minimized.

More specifically, when at least one secondary particle is pressed under 9 tons, the primary macro particle is separated, and the secondary particle itself does not crack.

Accordingly, after 9 ton press applied to the positive electrode active material according to an aspect of the present disclosure, fine particles of 1 μm or less are less than 10%.

In a specific embodiment of the present disclosure, a ratio of the average particle size D50 of the secondary particle/the average particle size D50 of the primary macro particle may be 2 to 4 times.

Meanwhile, the secondary particle according to the present disclosure has true density (crystal density) of 4.74 or more.

The inventors have studied to simultaneously improve the life and resistance characteristics of positive electrode active materials. During the course of the study, they found that in some cases, there is a difference in electrical and chemical performance even though primary macro particles increase in average particle size and crystal size.

As a result of research in attempt to solve the problem, surprisingly, the inventors found that when the average particle size and crystal size of the primary particle and the crystal density of the secondary particle are simultaneously controlled, it is possible to provide a positive electrode active material with improved life and resistance characteristics.

In a specific embodiment of the present disclosure, the crystal density of the secondary particle may be 4.74 or more, 4.77 or more, or 4.78 or more, and may be 4.80 or less.

Composition

The secondary particle may comprise nickel-based lithium transition metal oxide.

In this instance, the nickel-based lithium transition metal oxide may comprise $LiaNi_{1-x-y}Co_xM1_yM2_wO_2$ ($1.0 \le a \le 1.5$, $0 \le x \le 0.2$, $0 \le y \le 0.2$, $0 \le w \le 0.1$, $0 \le x+y \le 0.2$, M1 is at least one selected from the group consisting of Mn and Al, and M2 is at least one selected from the group consisting of Ba, Ca, Zr, Ti, Mg, Ta, Nb and Mo).

In the above formula, a, x, y, and w denote a mole ratio of each element in the nickel-based lithium transition metal oxide.

In this instance, the doped metal M1 and M2 in the crystal lattice of the secondary particle may be disposed on the surface of only a part of the particle depending on the position preference of M1 and/or M2, and may be positioned with a concentration gradient that decreases in a direction from the particle surface to the center of the particle, or may be uniformly positioned over the entire particle.

When the secondary particle is doped with or coated and doped with metal M1 and M2, in particular, the long life characteristics of the active material may be further improved by surface structure stabilization.

The positive electrode active material may be coated with a boron containing material such as lithium boron oxide on the surface, and may be coated such that the boron content is, for example, 2000 ppm or less. The coating method of the boron containing material is well known in the corresponding technical field.

The positive electrode active material may be coated with a cobalt containing material such as lithium cobalt oxide on the surface, and may be coated such that the cobalt content is, for example, 20,000 ppm or less. The coating method of the cobalt containing material is well known in the corresponding technical field.

Method for Preparing a Positive Electrode Active Material

The positive electrode active material according to an aspect of the present disclosure may be prepared by the following method. However, the present disclosure is not limited thereto.

Specifically, the method comprises (S1) mixing a nickel-based transition metal oxide precursor having the tap density of 2.0 g/cc or less and a lithium precursor, and performing primary sintering; and (S2) performing secondary sintering on the primary sintered product, wherein a positive electrode active material for a lithium secondary battery comprising at least one secondary particle comprising an agglomerate of primary macro particles is prepared through the primary sintering and the secondary sintering.

The method for preparing a positive electrode active material will be additionally described for each step.

To begin with, a positive electrode active material precursor comprising nickel (Ni), cobalt (Co) and manganese (Mn) having the tap density of 2.0 g/cc or less is prepared.

In this instance, the precursor for preparing the positive electrode active material may be a commercially available positive electrode active material precursor, or may be prepared by a method for preparing a positive electrode active material precursor well known in the corresponding technical field.

For example, the precursor may be prepared by adding an ammonium cation containing complex forming agent and a basic compound to a transition metal solution comprising a nickel containing raw material, a cobalt containing raw material and a manganese containing raw material and causing coprecipitation reaction.

The nickel containing raw material may include, for example, nickel containing acetate, nitrate, sulfate, halide, sulfide, hydroxide, oxide or oxyhydroxide, and specifically, may include at least one of $Ni(OH)_2$, $NiO$, $NiOOH$, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, an aliphatic nickel salt or nickel halide, but is not limited thereto.

The cobalt containing raw material may include cobalt containing acetate, nitrate, sulfate, halide, sulfide, hydroxide, oxide or oxyhydroxide, and specifically, may include at least one of $Co(OH)_2$, $CoOOH$, $Co(OCOCH_3)_2 \cdot 4H_2O$, $Co(NO_3)_2 \cdot 6H_2O$, $CoSO_4$, or $Co(SO_4)_2 \cdot 7H_2O$, but is not limited thereto.

The manganese containing raw material may include, for example, at least one of manganese containing acetate, nitrate, sulfate, halide, sulfide, hydroxide, oxide or oxyhydroxide, and specifically, may include, for example, at least one of manganese oxide such as $Mn_2O_3$, $MnO_2$, $Mn_3O_4$; a manganese salt such as $MnCO_3$, $Mn(NO_3)_2$, $MnSO_4$, manganese acetate, a manganese salt of dicarboxylic acid, manganese citrate and an aliphatic manganese salt; manganese oxyhydroxide or manganese chloride, but is not limited thereto.

The transition metal solution may be prepared by adding the nickel containing raw material, the cobalt containing raw material and the manganese containing raw material to a solvent, to be specific, water, or a mixed solvent of water and an organic solvent (for example, alcohol, etc.) that mixes with water to form a homogeneous mixture, or by mixing an aqueous solution of the nickel containing raw material, an aqueous solution of the cobalt containing raw material and the manganese containing raw material.

The ammonium cation containing complex forming agent may include, for example, at least one of $NH_4OH$, $(NH_4)_2SO_4$, $NH_4NO_3$, $NH_4Cl$, $CH_3COONH_4$ or $(NH_4)_2CO_3$, but is not limited thereto. Meanwhile, the ammonium cation containing complex forming agent may be used in the form of an aqueous solution, and in this instance, a solvent may include water or a mixture of water and an organic solvent (specifically, alcohol, etc.) that mixes with water to form a homogeneous mixture.

The basic compound may include at least one of hydroxide or hydrate of alkali metal or alkaline earth metal such as NaOH, KOH or Ca(OH)$_2$. The basic compound may be used in the form of an aqueous solution, and in this instance, a solvent may include water, or a mixture of water and an organic solvent (specifically, alcohol, etc.) that mixes with water to form a homogeneous mixture.

The basic compound may be added to control the pH of the reaction solution, and may be added in such an amount that the pH of the metal solution is 9 to 11.

Meanwhile, the coprecipitation reaction may be performed at 40° C. to 70° C. in an inert atmosphere of nitrogen or argon.

Particles of nickel-cobalt-manganese hydroxide are produced by the above-described process, and settle down in the reaction solution. A precursor having the nickel (Ni) content of 60 mol % or more in the total metal content may be prepared by adjusting the concentration of the nickel containing raw material, the cobalt containing raw material and the manganese containing raw material. The settled nickel-cobalt-manganese hydroxide particles are separated by the common method and dried to obtain a nickel-cobalt-manganese precursor. The precursor may be a secondary particle formed by agglomeration of primary particles.

Subsequently, the above-described precursor is mixed with a lithium raw material and goes through primary sintering.

The lithium raw material may include, without limitation, any type of material that dissolves in water, for example, lithium containing sulfate, nitrate, acetate, carbonate, oxalate, citrate, halide, hydroxide or oxyhydroxide. Specifically, the lithium raw material may include at least one of Li$_2$CO$_3$, LiNO$_3$, LiNO$_2$, LiGH, LiGH·H$_2$O, LiH, LiF, LiCl, LiBr, LiI, CH$_3$COOLi, Li$_2$O, Li$_2$SO$_4$, CH$_3$COOLi, or Li$_3$C$_6$H$_5$O$_7$.

In the case of high-Ni NCM based lithium composite transition metal oxide having the nickel (Ni) content of 60 mol % or more, the primary sintering may be performed at 700 to 1,000° C., more preferably 780 to 980° C., and even more preferably 780 to 900° C. The primary sintering may be performed in air or an oxygen atmosphere, and may be performed for 10 to 35 hours.

Subsequently, after the primary sintering, additional secondary sintering may be performed.

In the case of high-Ni NCM based lithium composite transition metal oxide having the nickel (Ni) content of 60 mol % or more, the secondary sintering may be performed at 650 to 800° C., more preferably 700 to 800° C., and even more preferably 700 to 750° C.

The secondary sintering may be performed in air or an oxygen atmosphere, and the secondary sintering may be performed with an addition of cobalt oxide or cobalt hydroxide at a concentration of 0 to 20,000 ppm.

Meanwhile, the method does not comprise any washing process between the steps (S1) and (S2).

The positive electrode active material comprising a secondary particle agglomerate comprising primary macro particles may be prepared by the above-described process.

Positive Electrode and Lithium Secondary Battery

According to another embodiment of the present disclosure, there are provided a positive electrode for a lithium secondary battery, comprising the positive electrode active material, and a lithium secondary battery.

Specifically, the positive electrode comprises a positive electrode current collector and a positive electrode active material layer comprising the positive electrode active material, formed on the positive electrode current collector.

In the positive electrode, the positive electrode current collector is not limited to a particular type and may include any type of material having conductive properties without causing any chemical change to the battery, for example, stainless steel, aluminum, nickel, titanium, sintered carbon or aluminum or stainless steel treated with carbon, nickel, titanium or silver on the surface. Additionally, the positive electrode current collector may be generally 3 to 500 μm in thickness, and may have microtexture on the surface to improve the adhesion strength of the positive electrode active material. For example, the positive electrode current collector may come in various forms, for example, films, sheets, foils, nets, porous bodies, foams and non-woven fabrics.

In addition to the above-described positive electrode active material, the positive electrode active material layer may comprise a conductive material and a binder.

In this instance, the conductive material is used to impart conductivity to the electrode, and may include, without limitation, any type of conductive material having electron conductivity without causing any chemical change in the battery. Specific examples of the conductive material may include at least one of graphite, for example, natural graphite or artificial graphite; carbon-based materials, for example, carbon black, acetylene black, ketjen black, channel black, furnace black, lamp black, thermal black and carbon fibers; metal powder or metal fibers, for example, copper, nickel, aluminum and silver; conductive whiskers, for example, zinc oxide and potassium titanate; conductive metal oxide, for example, titanium oxide; or conductive polymers, for example, polyphenylene derivatives. In general, the conductive material may be included in an amount of 1 to 30 weight % based on the total weight of the positive electrode active material layer.

Additionally, the binder serves to improve the bonds between the positive electrode active material particles and the adhesion strength between the positive electrode active material and the positive electrode current collector. Specific examples of the binder may include at least one of polyvinylidene fluoride (PVDF), polyvinylidene fluoride-hexafluoropropylene copolymer (PVDF-co-HFP), polyvinylalcohol, polyacrylonitrile, carboxymethylcellulose (CMC), starch, hydroxypropyl cellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber (SBR), fluoro rubber, or a variety of copolymers thereof. The binder may be included in an amount of 1 to 30 weight % based on the total weight of the positive electrode active material layer.

The positive electrode may be manufactured by the commonly used positive electrode manufacturing method except using the above-described positive electrode active material. Specifically, the positive electrode may be manufactured by coating a positive electrode active material layer forming composition comprising the positive electrode active material and optionally, the binder and the conductive material on the positive electrode current collector, drying and rolling. In this instance, the type and amount of the positive electrode active material, the binder and the conductive material may be the same as described above.

The solvent may include solvents commonly used in the technical field pertaining to the present disclosure, for example, at least one of dimethyl sulfoxide (DMSO), isopropyl alcohol, N-methylpyrrolidone (NMP), acetone or water. The solvent may be used in such an amount to have sufficient viscosity for good thickness uniformity when dissolving or dispersing the positive electrode active material, the conductive material and the binder and coating to manufacture the positive electrode in terms of the slurry coating thickness and the production yield.

Alternatively, the positive electrode may be manufactured by casting the positive electrode active material layer forming composition on a support, peeling off a film from the support and laminating the film on the positive electrode current collector.

According to still another embodiment of the present disclosure, there is provided an electrochemical device comprising the positive electrode. Specifically, the electrochemical device may include a battery or a capacitor, and more specifically, a lithium secondary battery.

Specifically, the lithium secondary battery comprises a positive electrode, a negative electrode disposed opposite the positive electrode, a separator interposed between the positive electrode and the negative electrode and an electrolyte, and the positive electrode is the same as described above. Additionally, optionally, the lithium secondary battery may further comprise a battery case in which an electrode assembly comprising the positive electrode, the negative electrode and the separator is received, and a sealing member to seal up the battery case.

In the lithium secondary battery, the negative electrode comprises a negative electrode current collector and a negative electrode active material layer positioned on the negative electrode current collector.

The negative electrode current collector may include any type of material having high conductivity without causing any chemical change to the battery, for example, copper, stainless steel, aluminum, nickel, titanium, sintered carbon, copper or stainless steel treated with carbon, nickel, titanium or silver on the surface and an aluminum-cadmium alloy, but is not limited thereto. Additionally, the negative electrode current collector may be generally 3 to 500 µm in thickness, and in the same way as the positive electrode current collector, the negative electrode current collector may have microtexture on the surface to improve the bonding strength of the negative electrode active material. For example, the negative electrode current collector may come in various forms, for example, films, sheets, foils, nets, porous bodies, foams and non-woven fabrics.

In addition to the negative electrode active material, the negative electrode active material layer optionally comprises a binder and a conductive material. For example, the negative electrode active material layer may be made by coating a negative electrode forming composition comprising the negative electrode active material, and optionally the binder and the conductive material on the negative electrode current collector and drying, or casting the negative electrode forming composition on a support, peeling off a film from the support and laminating the film on the negative electrode current collector.

The negative electrode active material may include compounds capable of reversibly intercalating and deintercalating lithium. Specific examples of the negative electrode active material may include at least one of a carbonaceous material, for example, artificial graphite, natural graphite, graphitizing carbon fibers, amorphous carbon; a metallic compound that can form alloys with lithium, for example, Si, Al, Sn, Pb, Zn, Bi, In, Mg, Ga, Cd, Si alloy, Sn alloy or Al alloy; metal oxide capable of doping and undoping lithium such as $SiO_\beta$ ($0 \leq \beta \leq 2$), $SnO_2$, vanadium oxide, lithium vanadium oxide; or a complex comprising the metallic compound and carbonaceous material such as a Si—C complex or a Sn—C complex. Additionally, a metal lithium thin film may be used for the negative electrode active material. Additionally, the carbon material may include low crystalline carbon and high crystalline carbon. The low crystalline carbon typically includes soft carbon and hard carbon, and the high crystalline carbon typically includes high temperature sintered carbon, for example, amorphous, platy, flaky, spherical or fibrous natural graphite or artificial graphite, Kish graphite, pyrolytic carbon, mesophase pitch based carbon fiber, meso-carbon microbeads, mesophase pitches and petroleum or coal tar pitch derived cokes.

Additionally, the binder and the conductive material may be the same as those of the above-described positive electrode.

Meanwhile, in the lithium secondary battery, the separator separates the negative electrode from the positive electrode and provides a passage for movement of lithium ions, and may include, without limitation, any separator commonly used in lithium secondary batteries, and in particular, preferably, the separator may have low resistance in the movement of ions in the electrolyte and good electrolyte solution wettability. Specifically, for example, a porous polymer film made of polyolefin-based polymer such as ethylene homopolymer, propylene homopolymer, ethylene/butene copolymer, ethylene/hexene copolymer and ethylene/methacrylate copolymer or a stack of two or more porous polymer films may be used. Additionally, common porous non-woven fabrics, for example, nonwoven fabrics made of high melting point glass fibers and polyethylene terephthalate fibers may be used. Additionally, to ensure the heat resistance or mechanical strength, the coated separator comprising ceramics or polymer materials may be used, and may be selectively used with a single layer or multilayer structure.

Additionally, the electrolyte used in the present disclosure may include an organic liquid electrolyte, an inorganic liquid electrolyte, a solid polymer electrolyte, a gel polymer electrolyte, a solid inorganic electrolyte and a molten inorganic electrolyte that may be used in the manufacture of lithium secondary batteries, but is not limited thereto.

Specifically, the electrolyte may comprise an organic solvent and a lithium salt.

The organic solvent may include, without limitation, any type of organic solvent that acts as a medium for the movement of ions involved in the electrochemical reaction of the battery. Specifically, the organic solvent may include an ester-based solvent, for example, methyl acetate, ethyl acetate, γ-butyrolactone, ε-caprolactone; an ether-based solvent, for example, dibutyl ether or tetrahydrofuran; a ketone-based solvent, for example, cyclohexanone; an aromatic hydrocarbon-based solvent, for example, benzene, fluorobenzene; a carbonate-based solvent, for example, dimethylcarbonate (DMC), diethylcarbonate (DEC), methylethylcarbonate (MEC), ethylmethylcarbonate (EMC), ethylene carbonate (EC), propylene carbonate (PC); an alcohol-based solvent, for example, ethylalcohol, isopropyl alcohol; nitriles of R—CN (R is C2-C20 straight-chain, branched-chain or cyclic hydrocarbon, and may comprise an exocyclic double bond or ether bond); amides, for example, dimethylformamide; dioxolanes, for example, 1,3-dioxolane; or sulfolanes. Among them, the carbonate-based solvent is desirable, and more preferably, cyclic carbonate (for example, ethylene carbonate or propylene carbonate) having high ionic conductivity and high dielectric constant which contributes to the charge/discharge performance improvement of the battery may be mixed with a linear carbonate-based compound (for example, ethylmethyl carbonate, dimethyl carbonate or diethyl carbonate) of low viscosity. In this case, the cyclic carbonate and the chain carbonate may be mixed at a volume ratio of about 1:1 to about 1:9 to improve the performance of the electrolyte solution.

The lithium salt may include, without limitation, any compound that can provide lithium ions used in lithium secondary batteries. Specifically, the lithium salt may include $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$. The concentration of the lithium salt may range from 0.1 to 2.0 M. When the concentration of the lithium salt is included in the above-described range, the electrolyte has optimal conductivity and viscosity, resulting in good electrolyte performance and effective movement of lithium ions.

In addition to the constituent substances of the electrolyte, the electrolyte may further comprise, for example, at least one type of additive of a haloalkylene carbonate-based compound such as difluoro ethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride to improve the life characteristics of the battery, prevent the capacity fading of the battery and improve the discharge capacity of the battery. In this instance, the additive may be included in an amount of 0.1 to 5 weight % based on the total weight of the electrolyte.

The lithium secondary battery comprising the positive electrode active material according to the present disclosure is useful in the field of portable devices including mobile phones, laptop computers and digital cameras, and electric vehicles including hybrid electric vehicles (HEVs).

Accordingly, according to another embodiment of the present disclosure, there are provided a battery module comprising the lithium secondary battery as a unit cell and a battery pack comprising the same.

The battery module or the battery pack may be used as a power source of at least one medium-large scale device of a power tool; an electric vehicle comprising an electric vehicle (EV), a hybrid electric vehicle, and a plug-in hybrid electric vehicle (PHEV); or an energy storage system.

Hereinafter, the embodiments of the present disclosure will be described in sufficiently detail for those having ordinary skill in the technical field pertaining to the present disclosure to easily practice the present disclosure. However, the present disclosure may be embodied in many different forms and is not limited to the disclosed embodiments.

Example 1

Preparation of Positive Electrode Active Material

A nickel-cobalt-manganese containing hydroxide $(Ni_{0.86}Co_{0.07}Mn_{0.07}(OH)_2)$ positive electrode active matepowder was put into an alumina furnace of 330 mm×330 mm in size and underwent primary sintering at 900° C. for 10 hours under an oxygen $(O_2)$ atmosphere to form a primary sintered product.

Subsequently, the primary sintered product was ground using a Jet mill at feeding of 80 psi and grinding of 60 psi.

The ground primary sintered product was put into the alumina furnace of 330 mm×330 mm in size, and underwent secondary sintering at 700° C. for 5 hours under an oxygen $(O_2)$ atmosphere with an addition of $Co(OH)_2$ at 10,000 ppm to prepare a positive electrode active material.

Example 2

A positive electrode active material was prepared by the same method as example 1 except that the tap density of the precursor was 1.5 g/cc, the primary sintering temperature was lowered by 20° C., LiOH was introduced into a henschel mixer (700 L) such that the final Li/M(Ni,Co,Mn) mole ratio was 1.05, and Li was added in an amount of 0.02 mol % during secondary coating.

Comparative Example 4 liters of distilled water was put into a coprecipitation reactor (capacity 20 L), 100 mL of 28 wt % ammonia aqueous solution was added while maintaining 50° C., and a transition metal solution with the concentration of 3.2 mol/L, in which $NiSO_4$, $CoSO_4$, $MnSO_4$ and $Al_3(SO_4)_2$ were mixed at a mole ratio of nickel:cobalt:manganese:aluminum of 82:5:11:2, and a 28 wt % ammonia aqueous solution were continuously put into the reactor at 300 mL/hr and 42 mL/hr, respectively. Stirring was performed at the impeller speed of 400 rpm, and a 40 wt % sodium hydroxide solution was used to maintain the pH at 11.0. Precursor particles were formed by 24-hour coprecipitation reaction. The precursor particles were separated, washed and dried in an oven of 130° C. to prepare a precursor.

The $Ni_{0.82}Co_{0.05}Mn_{0.11}Al_{0.02}(OH)_2$ precursor synthesized by coprecipitation reaction was mixed with $Li_2CO_3$ at a Li/Me (Ni, Co, Mn, Al) mole ratio of 1.03, and thermally treated at 800° C. for 10 hours under an oxygen atmosphere to prepare a positive electrode active material comprising $LiNi_{0.82}Co_{0.05}Mn_{0.11}Al_{0.02}O_2$ lithium composite transition metal oxide.

TABLE 1

| Sample | | a (Å³) | c (Å³) | Cell Volume. (Å³) | Crystal Density (g/cc) | Average particle of primary particle (μm) | Crystal size of primary particle (nm) | Ratio of average particle of primary particle/ crystal size of primary particle |
|---|---|---|---|---|---|---|---|---|
| Comparative example | #1 | 2.8737 | 14.222 | 101.71 | 4.729 | 0.48 | 129 | 3.69 |
| | #2 | 2.8737 | 14.223 | 101.72 | 4.729 | | 130 | |
| | AVG | 2.874 | 14.22 | 101.7 | 4.729 | | 130 | |
| Example 1 | #1 | 2.8737 | 14.215 | 101.66 | 4.758 | 2.57 | 284 | 9.08 |
| | #2 | 2.8737 | 14.215 | 101.66 | 4.758 | | 282 | |
| | AVG | 2.874 | 14.22 | 101.7 | 4.758 | | 283 | |
| Example 2 | #1 | 2.8735 | 14.195 | 101.50 | 4.782 | 2.50 | 250 | 10.08 |
| | #2 | 2.8735 | 14.194 | 101.50 | 4.782 | | 246 | |
| | AVG | 2.874 | 14.19 | 101.5 | 4.782 | | 248 | |

** a,c denote the unit cell size and the cell volume value, respectively, in the XRD analysis of the positive electrode active material.

rial precursor having the tap density of 1.8 g/cc and a lithium raw material LiOH were put into a henschel mixer (700 L) such that the final Li/M(Ni,Co,Mn) mole ratio was 1.01, and mixed at 300 rpm center shaft for 20 minutes. The mixed

[Experimental Example 1: Average Particle Size]

D50 may be defined as a particle size at 50% of particle size distribution, and was measured using a laser diffraction method.

[Experimental Example 2: Crystal Size of Primary Particle]

The sample was measured using Bruker Endeavor (Cu Kα, λ=1.54 Å) equipped with LynxEye XE-T position sensitive detector with the step size of 0.020 in the scan range of 90° FDS 0.5°, 2-theta 15°, to make the total scan time of 20 minutes.

Rietveld refinement of the measured data was performed, considering the charge at each site (metals at transition metal site +3, Ni at Li site +2) and cation mixing. In crystal size analysis, instrumental broadening was considered using Fundamental Parameter Approach (FPA) implemented in Bruker TOPAS program, and in fitting, all peaks in the measurement range are used. The peak shape fitting was only performed using Lorentzian contribution to First Principle (FP) among peak types available in TOPAS, and in this instance, strain was not considered. The crystal size results are shown in the above table 1.

[Experimental Example 3. Crystal Density Measurement]

The sample was measured using Bruker Endeavor (Cu Kα, λ=1.54 Å) equipped with X LynxEye XE-T position sensitive detector, with the step size of 0.020 in the scan range of 900 FDS 0.5°, 2-theta 15° to make the total scan time of 20 minutes. Crystal density=(Weight of elements in unit cell, g)/(Unit cell volume, cm3) was calculated based on the measured data.

[Experimental Example 4. High Temperature Life Characteristics of Coin Full Cell]

Each lithium secondary battery full cell manufactured as below using each of the positive electrode active materials prepared in examples 1-2 and comparative example was charged at 0.7 C, 45° C. in a CC-CV mode until 4.25V and discharged at 0.5 C constant current until 2.5V, and capacity retention in 300 cycles of the charge/discharge test was measured to evaluate the life characteristics. The results are shown in FIG. 1 and Table 2.

TABLE 2

| Sample | Unit | Comparative example | Example 1 | Example 2 |
|---|---|---|---|---|
| 45° C. DCIR | 1st (ohm) | 13.6 | 14.1 | 13.3 |
| (average, 3ea) | 50th (ohm) | 30.3 | 27.6 | 23.5 |
| | ΔDCIR (%) | 122.6 | 96.0 | 76.3 |
| Capacity Retention | % | 90.9 | 87.2 | 94.3 |

[Experimental Example 5: Measurement of DCR Resistance as a Function of SOC]

After preparation of a coin full cell, 10 hr rest, formation (0.2 C/0.2 C) and charge/discharge, a resistance value at each SOC was calculated by applying a discharge pulse (1.0 C pulse 10 sec) after SOC setting on the basis of the discharge capacity measured in the formation after 4.25V charge.

DC-IR is calculated as DCIR=(V0−V1)/I (V0=voltage before pulse, V1=voltage after pulse 10s, I=applied current)

Figure 2:
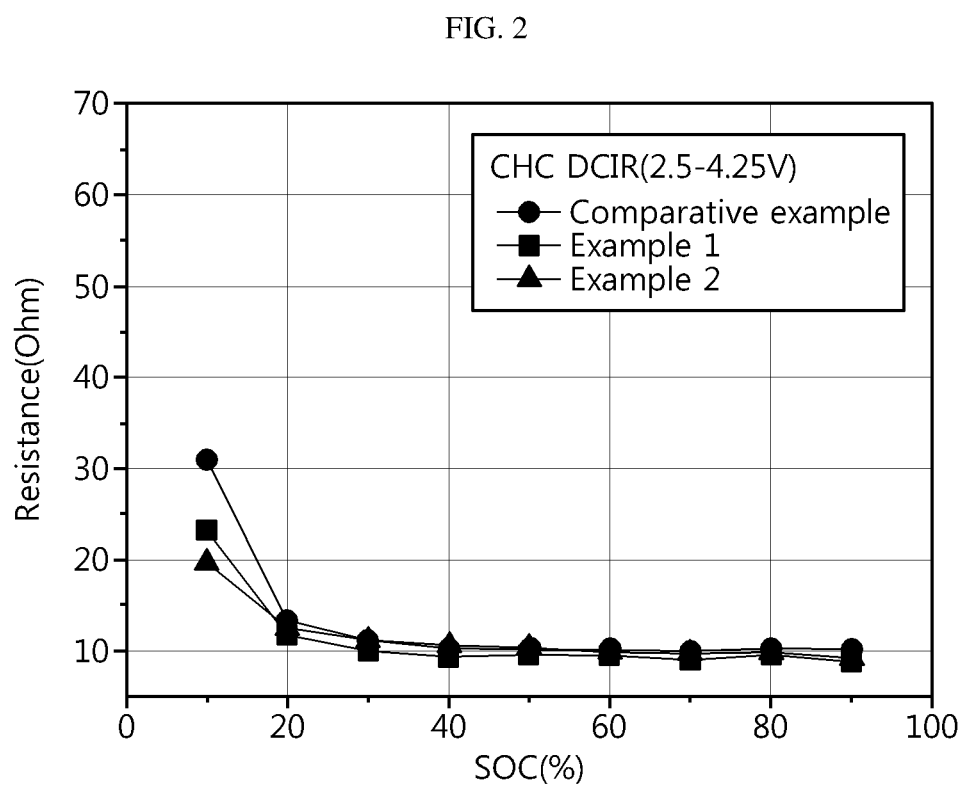

The results are shown in FIG. 2 and Tables 2 and 3.

TABLE 3

| Sample | Unit | Comparative example 1 | Example 1 | Example 2 |
|---|---|---|---|---|
| SOC 10 | Ω | 30.92 | 23.19 | 19.71 |

What is claimed is:

1. A positive electrode active material for a lithium secondary battery, comprising:

at least one secondary particle comprising an agglomerate of primary macro particles, wherein an average particle size (D50) of the primary macro particle is 2 μm or more, a ratio of the average particle size (D50) of the primary macro particle to an average crystal size of the primary macro particle is 8 or more, an average particle size (D50) of the secondary particle is 3 μm to 10 μm, and a crystal density of the secondary particle is 4.74 g/cm³ or more.

2. The positive electrode active material for a lithium secondary battery according to claim 1, wherein the average crystal size of the primary macro particle is 200 nm or more.

3. The positive electrode active material for a lithium secondary battery according to claim 1, wherein a ratio of the average particle size (D50) of the secondary particle to the average particle size (D50) of the primary macro particle is 2 to 4 times.

4. The positive electrode active material for a lithium secondary battery according to claim 1, wherein the secondary particle comprises nickel-based lithium transition metal oxide.

5. The positive electrode active material for a lithium secondary battery according to claim 4, wherein the nickel-based lithium transition metal oxide comprises $LiaNi_{1-x-y}Co_xM1_yM2_wO_2$, wherein $1.0 \leq a \leq 1.5$, $0 \leq x \leq 0.2$, $0 \leq y \leq 0.2$, $0 \leq w \leq 0.1$, $0 \leq x+y \leq 0.2$, M1 includes at least one selected from the group consisting of Mn and Al, and M2 includes at least one selected from the group consisting of Ba, Ca, Zr, Ti, Mg, Ta, Nb and Mo.

6. The positive electrode active material for a lithium secondary battery according to claim 1, wherein the positive electrode active material comprises a sintering additive, the sintering additive including at least one of zirconium, yttrium or strontium.

7. The positive electrode active material for a lithium secondary battery according to claim 1, wherein the positive electrode active material is coated with a boron containing material on a surface.

8. The positive electrode active material for a lithium secondary battery according to claim 1, wherein the positive electrode active material is coated with a cobalt containing material on a surface.

9. A positive electrode for a lithium secondary battery comprising the positive electrode active material according to claim 1.

10. A lithium secondary battery comprising the positive electrode active material according to claim 1.

11. A method for preparing the positive electrode active material for the lithium secondary battery of claim 1, the method comprising:

mixing a nickel-based transition metal oxide precursor having a tap density of 2.0 g/cc or less with a lithium precursor and performing primary sintering; and performing secondary sintering on the primary sintered product, wherein the positive electrode active material comprises at least one secondary particle comprising an agglomerate of primary macro particles through the primary sintering and the secondary sintering, an average particle size (D50) of the primary macro particle is 2 μm or more, a ratio of the average particle size (D50) of the primary macro particle/an average crystal size of the primary macro particle is 8 or more, and an average particle size (D50) of the secondary particle is 3 μm to 10 μm, and a crystal density of the secondary particle is 4.74 g/cm³ or more.

12. The method for preparing a positive electrode active material for a lithium secondary battery according to claim 11, wherein a temperature of the primary sintering is 780° C. to 900° C.

* * * * *